United States Patent [19]
Gensler

[15] 3,699,146
[45] Oct. 17, 1972

[54] SYNTHESIS OF METHYL MALVALATE AND METHYL 5,6-METHANO-5-UNDECENOATE

[72] Inventor: Walter J. Gensler, Belmont, Mass.

[73] Assignee: The United States of America as represented by the Secretary of Agriculture

[22] Filed: March 31, 1970

[21] Appl. No.: 24,338

[52] U.S. Cl.............260/464, 260/399, 260/410.9 R, 260/465.9, 260/468 P, 260/514 P, 260/544 L, 260/609 B, 260/648 R, 260/654 R
[51] Int. Cl. ...C07c 61/18, C07c 121/48, C07c 69/74
[58] Field of Search.........260/410.9 R, 468 P, 514 P, 260/464, 544 L, 648 US

[56] References Cited

OTHER PUBLICATIONS

Chemical Abstracts, Vol. 60, 3,997 f (1964)
Chemical Abstracts, Vol. 64, 1,008 g (1966)
Chemical Abstracts, Vol. 64, 14,101 b (1966)
J. Am. Chem Soc. Vol. 91(9), 2,397– 98 (4/23/69)
Gensler et al. (II), Syntheses of Labelled Methyl Malvalate, J. Chem. Soc. D, 1970, No. 5, p. 287, 3/4/70

Primary Examiner—Lewis Gotts
Assistant Examiner—Diana G. Rivers
Attorney—R. Hoffman and W. Bier

[57] ABSTRACT

This invention relates to the preparation of methyl malvalate, methyl 5,6-methano-5-undecenoate and the preparation of some new intermediates. Malvalic acid, the major cyclopropene component in cottonseed oil, has been synthesized. When 1-chloro-7-hexadecyne reacts with diazoacetic ester in the presence of copper bronze, the ester of 1-chloro-7,8-carboxymethano-7-hexadecene is formed. Treating the corresponding acid chloride with zinc chloride causes loss of carbon monoxide. Either sodium borohydride or lithium aluminum hydride reduces the resulting cyclopropenium compound to 1-chloro-7,8-methano-7-hexadecene. Replacing the chloro group with cyano yields malvalonitrile, which can be converted to methyl malvalate. An analogous sequence of steps has been applied to 1-chloro-4-decyne to produce methyl 5,6-methano-5-undecenoate. An alternate synthesis of methyl malvalate starts by using 1-chloro-7-hexadecyne as the precursor for methyl 8-heptadecynoate. This acetylenic ester is converted to 8,9-carboxymethano-8-heptadecenoic acid, the diacid chloride of which decarbonylates selectively in the presence of metallic chlorides to form the cyclopropenium-acid chloride. After esterification the resulting cyclopropenium-ester is reduced with borohydride to methyl malvalate.

1 Claim, No Drawings

SYNTHESIS OF METHYL MALVALATE AND METHYL 5,6-METHANO-5-UNDECENOATE

A non-exclusive, irrevocable, royalty-free license in the invention herein described, throughout the world for all purposes of the United States Government, with the power to grant sublicenses for such purposes, is hereby granted to the Government of the United States of America.

Malvalic acid and its homologue, sterculic acid, together with two other closely related fatty acids are the only well-characterized naturally occurring cyclopropenes. Methyl sterculate has been synthesized.

The present invention relates to syntheses of methyl malvalate (8) as well as to the synthesis of a related cyclopropene, methyl 5,6-methano-5-undecenoate.

The malvalate synthesis starts with 1-decyne (1), which as its lithium derivative, couples with 1,6-dichlorohexane to form 1-chloro-7-hexadecyne (2). Dropping diazoacetic ester into a hot mixture of 1-chloro-7-hexadecyne and powdered copper bronze produced the expected cyclopropene ester, which on saponification gave 1-chloro-7,8-(carboxymethano)-7-hexadecene (3). Our prior concern about the involvement of the carbon-to-chlorine bond was allayed when dodecyl chloride under the same conditions could be recovered largely unchanged. The acid chloride 4 from 3 when mixed with anhydrous zinc chloride, smoothly lost carbon monoxide to give cyclopropenium ion 5. Sodium borohydride in alkaline methanol or, better, lithium aluminum hydride in ether reduced the cyclopropenium ion to the corresponding cyclopropene, 1-chloro-7,8-methano-7-hexadecene (6). The methanethiol adduct of this cyclopropene, formed in 98 percent yield, was homogeneous according to gas-liquid chromatographic assay. Replacing the chloro group with cyano by heating with sodium cyanide in dimethyl sulfoxide yielded malvalonitrile (7), and finally, saponifcation and esterification led to the desired methyl malvalate (8). The yield of methyl malvalate from 1-chloro-7,8-methano-7-hexadecene (6) was 72 percent and from 1-chloro-7-hexadecyne (2) a was 23 percent. The ester was homogeneous as judged by thin-layer chromatography as well as by the gas-liquid chromatographic behavior of its methanethiol adduct. The nuclear magnetic resonance and infrared absorption curves were consistent with the assigned structure.

Methyl 5,6-methano-5-undecenoate was similarly synthesized by starting with 1-chloro-4-decyne and proceeding through an analogous series of intermediates, all well characterized. The decarbonylation step in this series made use of aluminum chloride instead of zinc chloride.

Two alternate pathways for synthesis of methyl malvalate were also explored. Instead of first removing the unwanted carboxyl group from the cyclopropene ring of intermediate 3 to give 6 and then attaching the necessary carbon atom (6 to 7) the steps were reversed, so that the chain in 3 was first extended by one carbon (3 to 9) and only then was the ring carboxyl removed (9 to 7). Although successful, this sequence offered no advantages and was not pursued. Another pathway was modeled after the earlier synthesis of methyl sterculate from methyl 9-octadecynoate. The starting ester, methyl 8-heptadecynoate (11) came from the corresponding nitrile 10, which in turn was obtained either from 1-chloro-7-hexadecyne (2) or 1-iodo-7-hexadecyne. Dibasic acid 12, prepared in 72 percent yield from the copper-catalyzed reaction of diazoacetic ester with methyl 8-heptadecynoate (11) followed by saponification, was converted to its diacid chloride 13. Decarbonylation with the help of zinc chloride removed the carboxyl carbon from the ring (as in 14) but did not attach the terminal group. Aluminum chloride

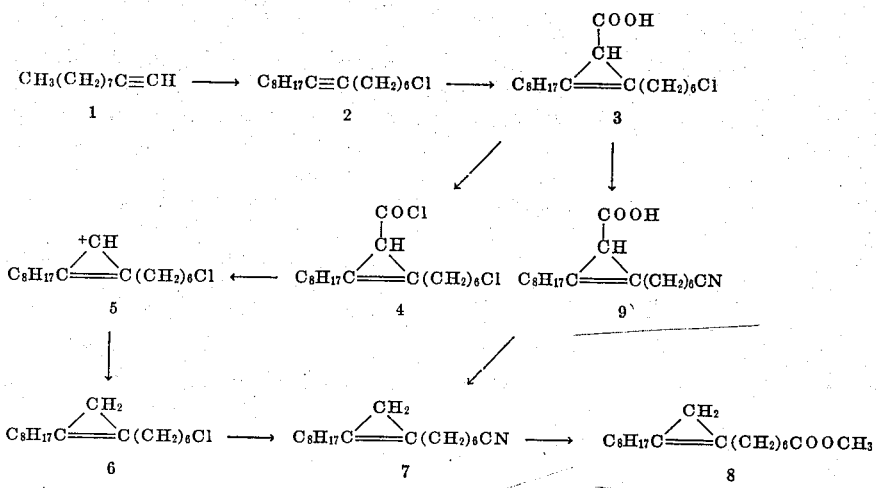

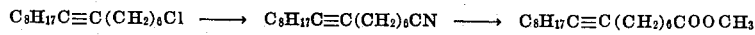

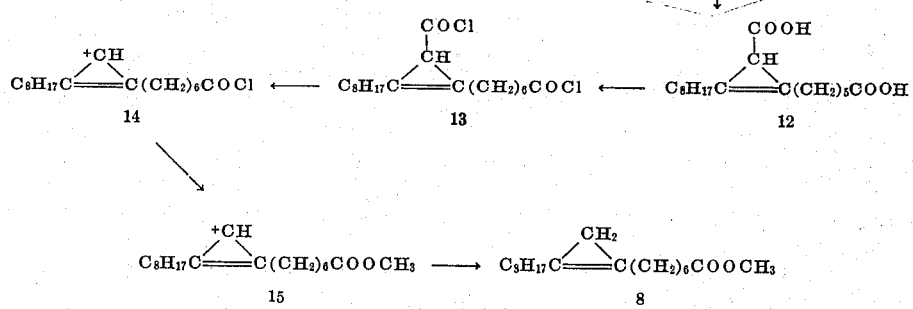

and ferric chloride were also effective in selectively and rapidly decarbonylating the ring carboxyl. The cyclopropenium ion-acid chloride 14 was esterified with one mole of methanol to give the ion-ester 15, and this was reduced with sodium borohydride to the final product, methyl malvalate (8). The overall yield from dibasic acid 12 was in the order of 40 percent.

The reagent pair, diethylzinc and methylene iodide, by inserting a methylene group into an olefinic bond, can develop a cyclopropane. If the method were applicable to acetylenes, methyl 8-heptadecynoate (11) could be transformed in one step to methyl malvalate (8). Trial of this possibility unfortunately gave no sign of cyclopropene material.

The syntheses realized here open the way to preparing methyl malvalate labeled at specific positions with radioactive carbon.

EXAMPLE 1

1-Chloro-7-hexadecyne (2). A mixture of white powdery lithium amide (1.15 g; 0.050 mol) and 6.9 g (0.050 mol) of freshly distilled 1-decyne (1) in 50 ml of dioxane that had been distilled from lithium aluminum hydride directly into the reaction flask was stirred and heated in a bath at 125–130°. Scrupulously dried glassware was used, and prepurified nitrogen blanketed the reaction mixture. To control the initial vigorous frothing, the bath had to be lowered for short periods then the vigorously stirred mixture, which changed quickly from pale yellow to brown, was boiled for 7.5 hours. Redistilled 1,6-dichlorohexane (23.3 g; 0.15 mol) was added in one portion to the slightly cooled dioxane suspension, which was then heated and stirred further for 2 days. More lithium amide was added (0.23 g; 0.010 mol) and the reaction was continued for another 14 hours.

The cooled mixture was treated carefully with 85 ml of water and then extracted with several portions of ether. The extracts were washed twice with water and once with saturated salt solution, and then were dried with sodium sulfate. Distillation through a 16 inch spinning-band column afforded several fractions, of which the second was recovered 1,6-dichlorohexane (12.1 g; b.p. 90–91° (19 mm)) and the fourth was water-white 1-chloro-7- hexadecyne, b.p. 115–118° (0.11 mm) and $n_D^{25}$ 1.4602. Both materials were 99 percent homogeneous according to gas-liquid chromatography on a 6 ft. neopentylglycol-succinate column at 140° and at 195°, respectively. The yield of chlorohexadecyne 2 was 8.4 g (65 percent based on decyne, or 45 percent based on 1,6-dichlorohexane not recovered). Another run on a double scale and with an 80-hr reaction period gave product in 72 percent yield (50 percent based on dichlorohexane).

A sample was prepared for analysis by chromatography through a column of silica gel with hexane as eluting solvent. The colorless material, carefully freed of solvent, showed a single spot on a thin-layer plate (hexane solvent).

Anal. Calcd. for $C_{16}H_{29}Cl$: C, 74.81; H, 11.38. Found: C, 74.83; H, 11.05.

The infrared absorption curve was not particularly informative, although a C—Cl was noted around 725 $cm^{-1}$; nmr (50 percent in $CCl_4$) δ 0.88 (poor triplet, $CH_3$), 1.29 (complex), 2.07 (complex $CH_2$'s at 6 and 9), 3.42 (t, J = 6 Hz, $CH_2$ at position 1). The integration ratio of the 3.42 ppm signal to all the others was close to the required 2:27.

1-iodo-7-hexadecyne could be prepared by starting with 0.43 mole of lithium amide, 0.40 mole of 1-decyne, and 0.45 mole of 1,6-diiodohexane and following essentially the above procedure. The iodohexadecyne was obtained as a faintly yellow liquid, b.p. 140–143°(0.01 mm) homogeneous according to gas-liquid chromatography, in 64 percent yield; nmr δ 0.88 (diffuse triplet, $CH_3$), 1.2–1.6 (multiplet), 1.9–2.2 (multiplet, $CH_2$'s at positions 6 and 9), 3.15 (t, J = 7 Hz, $CH_2$1). The integration ratio of the 3.15 ppm signal to all the others was 2:27.

EXAMPLE 2

1-Chloro-7,8-carboxymethano-7-hexadecene (3). In a 3-necked flask fitted with a vertical condenser (all scrupulously dry), a magnetically stirred mixture of 1-chloro-7-hexadecyne (2 : 5.15 g or 0.020 mol) plus 0.46 g of copper bronze was brought to 130° under a slow stream of prepurified nitrogen. Distilled ethyl diazoacetate (4.56 g or 0.040 mol) was added in small portions directly onto the stirred mixture. The nitrogen sweep was interrupted just before the first addition, and thereafter the evolving gases were led from the top of the condenser to a receiver over water. The bubbling observed after each addition of reagent lasted 3-4 min, after which time another portion was introduced. When all the diazoacetate had been added (25 min), heating was continued for another 10 min. The gas evolved corresponded to 91 percent of the expected 0.040 mole.

The reaction mixture plus a solution of 2.7 g (0.048 mol) of potassium hydroxide in 4 ml of water and 24 ml of methanol was boiled in a nitrogen atmosphere for 5½ hr. Water (100 ml) and hexane (50 ml) were added, and the separated aqueous phase was extracted with several 25-ml portions of 1:1 hexane-ether. According to its infrared absorption curve, the extracted material contained much ester; saponification of this portion, freed of solvent (1.3 g) was repeated using 0.2 g of potassium hydroxide in aqueous methanol.

Acidification of the alkaline layer from the first saponification at icebath temperatures to pH 5 with 4 N hydrochloric acid was followed without delay by ether extraction. The extracts were washed, dried, and then stripped of solvent to leave 4.7 g of a viscous brown oil. Similar treatment of the aqueous layer from the second saponification afforded an additional 0.5 g.

The combined organic acids (5.0 g) were chromatographed on a column of active silica gel (58 g) with a liter of 8:1 hexane-ether as developing solvent. After careful removal of all volatile material from the eluate, the oil remaining weighed 3.4 g (55 percent). From its thin-layer chromatogram (hexane-ether-acetic acid = 100:40:1), which showed one dominant spot accompanied by two faint spots, this material was accepted as practically pure 1-chloro-7,8-carboxymethano-7-hexadecene (3). It was suitable for use in the next stages.

In another similar preparation, the chloro-acid product 3 was chromatographed over silica gel containing some water (5 percent) and with a solvent of 6:1 hexane-ether with gradually increasing proportions of ether. After removing volatiles, the chloro-acid was pumped at room temperature ($10^{-4}$ mm).

Anal. Calcd. for $C_{18}H_{31}ClO_2$: C, 68.65; H, 9.92; Cl, 11.26. Found: C, 68.80; H, 9.76; Cl, 11.09.

This material on thin-layer chromatography (hexane-ether-acetic acid = 100:20:1) showed only one spot, $R_F$ 0.87; ir ($CCl_4$) 1,690 (C=O ), 1,900$^{-1}$ (cyclopropene); nmr (25 percent in $CCl_4$) δ 0.88 ill-defined t, $CH_3$), 1.30 and 1.45 (broad s's, $CH_2$'s at positions 2-5 and 10-16), 1.95 (s, cyclopropene H), 2.42 (m, $CH_2$ at positions 6 and 9), 3.45 ppm (t, J = 7 Hz, $CH_2$ at position 1). Integration showed a ratio of 2:28 for the signal at 3.45 ppm relative to all the rest. No signal for the carboxylic H was seen.

In another 0.020 mole run, saponification was effected by heating the crude adduct in a bath at 98° for 2 hours with a solution of 0.08 mole of sodium hydroxide in 225 ml of isopropanol and 4.5 ml of water. Chromatography of the acid fraction over silica gel deactivated with water (5 percent) and with 8:1 hexane-ether as eluting solvent afforded a faintly yellow oil (63 percent), which according to thin-layer chromatography and infrared absorption consisted of practically pure chloro-acid 3.

EXAMPLE 3

1-Chloro-7,8-methano-7-hexadecene (6). A mixture of 3.8 g (0.012 mol) of homogeneous 1-chloro-7,8-carboxymethano-7-hexadecene (3) and 3.1 g (0.024 mol) of oxalyl chloride was stirred under nitrogen at room temperature for 5¼ hr. After removing most of the volatile material, the viscous residual oily acid chloride 4 was pumped at 0.15 mm for a day; ir (neat), 1,775 (but not at 1,690), 1,905, 980 cm$^{-1}$. Use of ether solvent gave about the same results, as did replacing oxalyl chloride with thionyl chloride, or using a 3-fold instead of a 2-fold excess of oxalyl chloride.

To the clear stirred solution of the acid chloride (0.012 mol) in 25 ml of azeotropically dried methylene chloride under an atmosphere of nitrogen was added 1.72 (0.013 mol) of granular zinc chloride. The mixture, which frothed and very soon changed from orange to purple, was stirred for 4.5 hr. At this time most of the solid had dissolved and the bubbling had stopped.

The decarbonylation mixture was added over 10 min to a stirred, −80° solution of lithium aluminum hydride (0.57 g or 0.015 mol) in about 60 ml of ether that had been distilled from lithium aluminum hydride. The color was discharged instantaneously. After another 20 min at −80°, the cooling bath was removed, and water (0.6 ml), 0.6 ml of 15 percent aqueous sodium hydroxide, and more water (1.8 ml) were added. Filtration through diatomaceous earth (Celite) removed the gelatinous solids, which were rinsed on the funnel with fresh ether. After washing the combined yellow ethereal filtrates several times with saturated aqueous salt solution, the ether solution was dried with sodium sulfate. Removal of all volatile material left 3.1 g of dark crude product 6.

Chromatography through a 2 × 121 cm column containing 90–95 g of fresh silica gel with hexane as developing solvent was effective in resolving the mixture. After a fast moving component (0.1 g; $R_F$ > 0.9 on silica thin-layer plates with hexane solvent) had been removed with the first 200 ml of solvent, 1.6 g (50 percent) of the desired colorless 1-chloro-7,8-methano-7-hexadecene (6), homogeneous by thin-layer chromatography ($R_F$ 0.64), came through in the next 160 ml. An intermediate two-spot fraction (0.33 g) emerged in the following 340 ml, after which 0.26 g of faintly yellow 1-chloro-7-hexadecyne (2) appeared, with $R_F$ 0.13 (a second very faint spot was also visible). The yields given here are based on constant weights determined after long exposure to vacuum.

The slow moving recovered acetylene 2 was identified by direct thin-layer chromatographic comparison with authentic material as well as by gas liquid chromatography through a 10 percent silicone oil column at 210–212°.

In another preparation, the decarbonylated mixture was added to excess sodium borohydride in methanol containing 2 moles of sodium hydroxide for every mole of starting acid chloride. The temperature was kept at −33 to −38°. The yield of homogeneous 1-chloro-7,8-methano-7-hexadecene (6) was about 30 percent; some 1-chloro-7-hexadecyne (2) was obtained here too. The cyclopropene product 6 was identical with the same material produced from the lithium aluminum hydride reduction, as shown by identical ir and nmr absorption curves, as well as by the same results with the methanethiol adducts (see below).

1-Chloro-7,8-methano-7-hexadecene (6) showed the following properties: ir (neat) 725 (C–Cl), 1,010, 1,872 cm$^{-1}$ (The absence of any absorption peak at 1,773 cm$^{-1}$ supported the absence of any 1,3-disubstituted cyclopropene.); nmr (30 percent in $CCL_4$) δ 0.75 (s, cyclopropene $CH_2$), 0.91 (m, terminal $CH_3$), 1.29 (m, $CH_2$'s at positions 2–5 and 10–15), 2.39 (m, $CH_2$'s at 6 and 9), 3.48 (t, J = 6.5 Hz, $CH_2Cl$). The ratio of the area under the last signal to all the others corresponded closely to the required 2:29.

Anal. Calcd. for $C_{17}H_{31}Cl$: C, 75.38; H, 11.54.

Found: C, 75.18; H, 11.41.

The methyl mercaptan adduct was prepared by allowing 0.1142 g of the cyclopropene 6 to stand stoppered for 7 days at room temperature in ca. 2.9 ml of an ether solution previously saturated with dry methyl mercaptan at 10° or below. A jet of pure nitrogen was directed to the surface of the reaction mixture until the weight no longer decreased (0.1319 g or 98.1 percent). The colorless liquid adduct, on gas-liquid chromatography on a 10 percent silicone oil column at 235° gave a single symmetrical peak.

EXAMPLE 4

Methyl Malvalate (8) from 1-Chloro-7,8-methano-7-hexadecene (6). A slurry of 0.108 g (2.2 mmol) of dry sodium cyanide in 1 ml of dimethyl sulfoxide that had been dried with calcium hydride was stirred under nitrogen at 96° for a short time. 1-Chloro-7,8-methano-7-hexadecene (0.45 g; 1.66 mmol) was injected from a syringe, and the magnetic stirring and heating (90°) was continued for 1.5 hr. Water (4 ml) was added to the cooled reaction mixture, and the two-phase system was extracted with hexane. The extracts, washed first with water and then with saturated salt solution, were dried with sodium sulfate. The yellow malvalonitrile (7), freed of all volatiles, weighed 0.42 g (97 percent).

A solution of this nitrile (1.6 mmol) with sodium hydroxide (0.37 g; 9.2 mmol), water (0.3 ml) and 95 percent alcohol (2.4 ml) was stirred and boiled under an atmosphere of nitrogen for 7.5 hr and then was allowed to stand overnight. The clear orange solution was diluted with 5 – 7.5 ml of water plus 8 – 10 ml of methanol and then shaken with 4 ml of hexane. The two lower layers of the resulting three-phase system were mixed with 10 ml of 1:1 hexane-ether and then treated at 0° with 3 ml of 4N hydrochloric acid. With no unnecessary delay, the acid aqueous phase was further extracted with hexane-ether, and the combined organic extracts were washed with several small portions of water, dried with sodium sulfate, and then carefully freed of all volatile material. The residual orange malvalic acid, pumped at 0.1 mm, weighed 0.44 g (97 percent); ir (neat) 1,710 and 2,300 – 3,400 (COOH), 1,870 and 1,005 cm$^{-1}$.

This crude acid in 2 ml of ether was added in portions at 0° to 20 – 25 ml of an ethereal solution of diazomethane prepared from 14 mmol of N-nitroso-N-methyl-toluenesulfonamide. Low boiling materials were removed first by evaporation in a jet of pure nitrogen and then by exposure to reduced pressure in a rotary evaporator. The residual crude methyl malvalate (8; 0.45 g) was fractionated by chromatography on a 2.4 × 30 cm column containing 35 g of silica gel deactivated with 1.75 ml of water. The developing solvent was 15:1 hexane-ether. After the first 100 ml had been collected, methyl malvalate (8), homogenous according to thin-layer chromatography, emerged in the next 40 ml. Most of the solvent was removed, and the clear, colorless residual oil was then kept under reduced pressures until the weight held constant at 0.35 g (72 percent from 1-chloro-7,8-methano-7-hexadecene).

This methyl malvalate spotted on a silica plate together with the same material obtained from methyl 8-heptadecynoate (11) and developed with hexane-ether-acetic acid (100:40:1) showed a single spot moving exactly the same as the other product. The neat material gave an infrared absorption curve identical with the one from the alternative route; ir (neat) 1,748 (C=O) and 1,870 and 1,005 – 1,010 cm$^{-1}$; nmr (CCl$_4$) δ 0.72 (s, cyclopropene CH$_2$), 0.88 (distorted t, CH$_2$CH$_3$), 1.29 (complex), 2.11 (m, CH$_2$ at 2), 2.36 (m, CH$_2$'s at 7 and 10), 3.59 (s, OCH$_3$). Integration showed a ratio for the ester methyl group signal to all others of 3:31, as required.

The methyl mercaptan adduct, formed as described below in 100.4 percent yield, showed a single symmetrical peak at 21.2 min on gas-liquid chromatography through a silicone oil column (10 percent SF-96) at 225° plus a faster moving blip (<< 1 percent) at 9.2 min.

Additional information on the properties and purification of methyl malvalate is given below.

When purified malvalonitrile (7), prepared as described below, was hydrolyzed and esterified, essentially the same results were obtained.

EXAMPLE 5

Ethyl Diazoacetate with Dodecyl Chloride. Diazoacetic ester (13.7 g or 0.12 mol) was added dropwise over a 3¾ hr period to a stirred 145° mixture of dodecyl chloride (20.5g or 0.10 mol) plus copper bronze (0.05 g). The crude reaction mixture was mixed with a solution of 9.75 g (0.17 mol) of potassium hydroxide in 140 ml of methanol plus 24 ml of water, and the two-phase system was stirred and boiled for 3 hr. The recovered nonacidic material was a practically colorless oil (17.6 g; 86 percent), which according to its infrared absorption curve was unchanged starting material. The small quantity of acidic material, a mixture, was not investigated.

EXAMPLE 6

1-Chloro-4,5-(ethoxycarbonylmethano)-4-decene. According to the same general procedure as described above, ethyl diazoacetate (11.4 g; 0.10 mol) was added over a period of 4.5 hr to 17.3 g (0.10 mol) of 1-chloro-4-decyne plus 0.15 g of copper bronze. The bath temperature was 150 – 155°. After a further 20 min of heating, the liquid was fractionated through a spinning band column to give 6.4 g (37 percent) of unchanged 1-chloro-4-decyne, bp 33 – 35°, (0.01 – 0.0001 mm). A portion of the residual oil heated in a bath at 65° was evaporatively distilled (10$^{-4}$ mm) in a short path apparatus over a 12 hr period. The distillate was taken as the desired ester: ir 1,720 (C=O) and 1900 cm$^{-1}$; nmr (CCl$_4$) δ 0.97 (distorted t, distal CH$_3$), 1.18 (t, J = 7 Hz, OCH$_2$CH$_3$), 1.4 – 2.8 (m's, chain CH$_2$'s), 2.00 (s, cyclopropene H), 3.60 (t, J = 7 Hz, CH$_2$Cl), 4.03 (q, J = 7 Hz, OCH$_2$CH$_3$). A sample of the ester was sent for analysis after two more distillations.

Anal. Calcd. for C$_{14}$H$_{23}$ClO$_2$: C, 64.97; H, 8.96; Cl, 13.70. Found: C, 65.15; H, 8.95; Cl, 13.65.

EXAMPLE 7

1-Chloro-4,5-carboxymethano-4-decene. A double-sized preparation of the above ester was performed essentially as described above. The crude reaction mixture, dissolved in 200 ml of methanol and 40 ml of water containing 13.5 g (0.24 mol) of potassium hydroxide was boiled for 3 hr. Considerable 1-chloro-4-decyne (12.9 g; 37 percent) could be recovered from the nonacidic fraction. The dark oily acidic fraction (30.5 g) was chromatographed on a 3.7 × 27 cm column containing 200 g of silica gel deactivated with 10 g' of water; 2½ l of solvent was used, starting with 5:1 hexane-ether and ending with 1:1 hexane-ether. Fractions were combined on the basis of thin-layer chromatographic evidence. Faintly yellow 1-chloro-4,5-carboxymethano-4-decene (22.5 g; 49 percent) was obtained from the early fractions as one-spot material. A sample was evaporatively distilled at 90° ($10^{-4}$ mm).

Anal. Calcd. for $C_{12}H_{19}ClO_2$: C, 62.64; H, 8.28; Cl, 15.39. Found: C, 62.64; H, 8.42; Cl, 15.52

The acid in carbon tetrachloride showed ir absorption peaks at 1,695 (C=O), 2,300 – 3,500 (OH), and 1,905 $cm^{-1}$; nmr ($CCl_4$) δ 0.92 (distorted t, $CH_3$), 1.43 – 2.8 (broad signals, $CH_2$'s), 2.00 (s, cyclopropene H), 3.57 (t, J = 7 Hz, $CH_2Cl$). The nmr curves taken before and after distillation were identical.

A slower moving minor product (2.6 g), homogeneous according to thin-layer chromatography, was tentatively taken as 1-methoxy-4,5-carboxymethano-4-decene on the basis of its nmr curve: δ 0.90 (t, terminal $CH_3$), 1.42 and 2.45 (m's, $CH_2$'s), 1.96 (s, cyclopropene H), 3.26 (s, $OCH_3$), 3.38 (t, $CH_2OCH_3$).

EXAMPLE 8

1-Chloro-4,5-(chlorocarbonylmethano)-4-decene. A mixture of 2.3 g (0.010 mol) of 1-chloro-4,5-carboxymethano-4-decene with colorless thionyl chloride (2.4 g; 0.020 mol) was shaken occasionally under nitrogen during a 45 min period. After removing volatiles, the black residue was evaporatively distilled in a cold-finger apparatus at 60° ($10^{-4}$ mm) to give 2.0 g (81 percent) of the pale yellow acid chloride.

Anal. Calcd. for $C_{12}H_{18}Cl_2O$: C, 57.84; H, 7.28; Cl, 28.46. Vound: C, 58.11; H, 7.39; Cl, 28.74.

The acid chloride darkens on standing at room temperature, becoming black after 2 days.

EXAMPLE 9

1-Chloro-4,5-methano-4-decene. The cyclopropene acid (19.7 g or 0.085 mol) plus thionyl chloride (20 g or 0.17 mol) in 25 ml of ether was shaken for 1 hr. After most of the volatiles had been removed, the red-brown oily acid chloride was pumped at 0.1 mm for an hour.

Aluminum chloride (14.2 g or 0.11 mol) was rapidly weighed and then added in several portions over a 10 min period to a stirred solution of the crude acid chloride in 85 ml of dry methylene chloride at room temperature. Liberal use of nitrogen protected the reagents and reaction mixture from moisture. After one-half hr, the dark, almost opaque, solution was added dropwise over 20 min to a vigorously stirred mixture of 4.1 g (0.11 mol) of lithium aluminum hydride and 425 ml of ether. Icebath cooling and a nitrogen atmosphere were employed. After an additional 5 min, ether (25 ml) mixed with water (4 ml) was cautiously introduced, followed by 85 ml of 2.5 M sodium hydroxide solution. Crude dark-red product (14.5 g) was isolated essentially as described above in the preparation of the higher analogue 6.

Distillation through a spinning-band column allowed two water-white fractions to be collected. According to gas-liquid chromatography, the first fraction (0.93 g), b.p. 65 – 70° (1.8 mm), was a 3:2 mixture of 1-chloro-4-decyne (ret. time 7.0 min, the same as authentic material) and 1-chloro-4,5-methano-4-decene (ret. time 8.0 min). Use of a 6-ft Apiezon M column at 151° evidently caused little if any decomposition of the cyclopropene. The second fraction (6.9 g), b.p. 72 – 74° (1.5 mm) still showed a very small peak for 1-chloro-4-decyne but was essentially all 1-chloro-4,5-methano-4-decene.

Anal. Calcd. for $C_{11}H_{19}Cl$: C, 70.75; H, 10.26; Cl, 18.99. Found: C, 70.48; H, 9.99; Cl, 18.85.

The yield could be estimated as over 40 percent; ir ($CCl_4$) 1,870 and 1,010 $cm^{-1}$; nmr (25 percent in $CCl_4$) δ 0.78 (s, cyclopropene methylene), 0.90 (t, terminal $CH_3$), 1.40 (m), 18 – 2.0 (m, $CH_2$'s at positions 3 and 6), 3.48 (t, J = 7 Hz, $CH_2Cl$). The integration ratio of the δ 3.48 triplet to all the other signals was close to the correct 2:17.

EXAMPLE 10

Methyl 5,6-Methano-5-undecenoate. A slurry of 1-chloro-4,5-methano-4-decene (3.7 g or 0.020 mol), dried sodium cyanide (1.2 g; 0.025 mol), and dimethyl sulfoxide (6 ml) that had been exposed to calcium hydride was stirred in a bath at 100 – 110° for 1 hr. Processing the mixture essentially according to the corresponding preparation of malvalonitrile (7) gave 3.3 g (93 percent) of 1-cyano-4,5-methano-4-decene as a pale yellow liquid; ir ($CCl_4$) 2,250 (C ≡ N), 1,870 and 1,015 $cm^{-1}$. The nitrile, spotted on a silica plate and developed with hexane, produced a single spot at $R_F$ 0.51; no sign of any material appeared at $R_F$ 1, the value determined on the same plate for the starting chloride.

A solution of the nitrile (2.4 g or 0.013 mol) and sodium hydroxide (3.0 g) in 18 ml of 95 percent alcohol plus 2.2 ml of water was boiled under nitrogen for 11 hr. The 2.1 g of 5,6-methano-5-undecenoic acid isolated from this reaction mixture was dissolved in 8 ml of ether, and this solution was added slowly and with stirring to an ice cold solution of ca. 1.5 g (0.036 mol) of diazomethane in 100 ml of ether. The product (2.3 g) from this reaction was evaporatively distilled at 80° (0.02 mm) in a short-path cold finger apparatus to give 1.8 g (59 percent from the chloride) of faintly yellow methyl 5,6-methano-5-undecenoate.

Anal. Calcd. for $C_{13}H_{22}O_2$: C, 74.24; H, 10.55. Found: C, 74.10; H, 10.50.

Thin-layer chromatography on a silica plate with hexane solvent produced only a single spot, $R_F$ 0.79; nmr (25 percent in $CCl_4$) δ 0.77 (s, cyclopropene $CH_2$), 0.90 (distorted t, $CH_2CH_3$), 1.40 (complex), 1.7 – 2.9 (complex, $CH_2$'s at positions 2, 4, and 7), 3.58 (s, $COOCH_3$). The integration ratio of the ester methyl group to all other protons was exactly 3:19. No signals corresponding to any kind of olefinic hydrogen could be detected at δ > 4. Gas-liquid chromatography on a 6 ft Apiezon column at 151° indicated a single component; a 6 ft neopentylglycol-succinate column at 159° gave a main peak as well as two small shoulders on the long-retention time side of the main peak. We believe that the shoulders, rather than indicating minor impurities in the product, originate in the partial decomposition of the cyclopropene on the column.

EXAMPLE 11

1-Cyano-7,8-carboxymethano-7-hexadecene (9). Sodium cyanide (0.91 g; 19 mmol) that had been dried at 100° (reduced pressures) was stirred for a short time with dry dimethyl sulfoxide (5.5 ml) at 96°. 1-Chloro-7,8-carboxymethano-7-hexadecene (3; 2.5 g or 8.0 mmol) was introduced with the help of 1 ml of rinse dimethyl sulfoxide, and the stirred slurry was heated for 1¾ hr. Nitrogen blanketed the reaction mixture at all times. Shaking the cooled mixture with 20 ml of hexane plus 35 ml of 1.3 percent hydrochloric acid produced a troublesome emulsion (pH < 2) that could be broken by adding small portions of salt, methanol, and ether. The organic layer was washed several times with saturated salt solution, dried with sodium sulfate, and stripped of volatiles to leave 2.4 g of a dark brown residue. This was chromatographed on a 3.8 × 46 cm column of 150 g of silica gel deactivated with 7.5 g of water. Hexane-ether (3:1) was used to condition the column as well as for the initial eluting solvent (1.2 l); the hexane-ether ratio was then reduced to 2:1 (2.3 l) and finally to 1.5:1 (1.4 l). The desired nitrile product 9 (1.34 g after long pumping: 55 percent), homogenous according to thin-layer chromatography (hexane-ether-acetic acid = 100:85:1), was collected in several fractions in the last 2.4 l of eluate.

Anal. Calcd. for $C_{19}H_{31}NO_2$: C, 74.71; H, 10.23; N, 4.59. Found: C, 74.50; H, 10.35; N, 4.38.

The neat material showed ir absorption peaks at 3,500 – 2,400, 1,685 (small shoulder at 1,720), 2,250, 1,900, 990 cm$^{-1}$; nmr (CCl$_4$) δ 0.89 (t, CH$_3$), 1.30 (multiplet), 1.95 (s, cyclopropene H), 2.28 (poor t, CH$_2$CN), 2.42 (m, CH$_2$'s at 7 and 10).

Appreciable amounts of product 9 were found in the earlier eluate fractions, but as two-spot material.

EXAMPLE 12

Malvalonitrile (7) from 1-Cyano-7,8-carboxymethano-7-hexadecene (9). A solution of 1.1 g (3.6 mmol) of carboxymethano derivative 9 in 10 ml of dry ether containing 1.1 g (9.0 mmol) of thionyl chloride was stirred in a dry atmosphere for 1½ hr. Removal of volatiles followed by pumping at 0.15 mm for 16 hr left 1.2 g of the orange acid chloride; ir (neat) 2,250, 1,900, 1,775 and 1,720 (w), 980 cm$^{-1}$. Decarbonylation was effected by stirring a mixture of this acid chloride (13 ml) for 3¾ hr. The color soon became dark red, and all but traces of the solid dissolved. The decarbonylation mixture was added under nitrogen and over a 15 min period to a vigorously stirred solution of 0.68 g (18 mmol) of sodium borohydride in 16 ml of anhydrous methanol containing 0.31 g (7.8 mmol) of sodium hydroxide. The temperature was −45 to −50° or lower. A small amount of methylene chloride helped to complete the transfer. The resulting yellow two-phase mixture was stirred without cooling for 20 min.

After adding 35 ml of water, the stirred mixture at −15° was treated with 10.5 ml of 10 percent hydrochloric acid. The resulting frothing called for care. With no unnecessary delay, ether was added so that the organic phase was the upper one. The lower aqueous layer was extracted further with ether, and the combined organic extracts washed with 5 percent sodium bicarbonate solution, twice with water, and finally with saturated salt solution. The dried solution, freed of all solvent, left a clear yellow-orange residual oil of crude malvalonitrile (7).

Chromatography on a 2.1 × 45 cm column of silica gel (45 g) deactivated with 2.75 ml of water with 10:1 hexane-ether as developing solvent furnished a series of fractions that were combined on the basis of monitoring by thin-layer chromatography (hexane-ether-acetic acid = 100:40:1). Removal of solvents first in a rotary evaporator and then by exposure to a 0.1 mm vacuum for 12 hr gave very faintly colored one-spot malvalonitrile (7; 0.19 g or 20 percent).

Anal. Calcd. for $C_{18}H_{31}N$: C, 82.69; H, 11.95. Found: C, 82.94; H, 11.68.

The neat malvalonitrile absorbed in the infrared at 2,250, 1,870, 1,725 (weak), 1,010 cm$^{-1}$; nmr (CCl$_4$) δ 0.75 (s, cyclopropene CH$_2$), 0.90 (111-defined t, CH$_3$), 1.30 (complex), 2.19 – 2.29 (poor t, CH$_2$ at position 2), 2.42 (m, CH$_2$'s at 7 and 10).

Although additional amounts of the nitrile could be detected in all the other chromatography fractions, no attempt was made to isolate more of the homogeneous product.

EXAMPLE 13

1-Cyano-7-hexadecyne (10). Pure dimethyl sulfoxide (500 ml) that had been dried with calcium hydride was poured into a 3-necked flask containing sodium cyanide (19.6 g; 0.40 mol) previously held at 100° in vacuo. 1-Chloro-7-hexadecyne (76.8; 0.30 mol) was added dropwise to the stirred suspension heated in a 90° bath. Some tendency for the inside temperature to rise was noted. The mixture was stirred and heated at 105 – 115° for 2.5 hr. Dry nitrogen covered the reaction mixture at all times. The cooled mixture was poured into a liter of cold water, and the separated aqueous phase was extracted several times with ether. After washing the ether extracts with water they were combined with the original dimethyl sulfoxide phase and dried with magnesium sulfate. Removal of low-boiling materials followed by fractionation in a short-path still gave water-white 1-cyano-7-hexadecyne (10), b.p. 130 – 132° (0.01 mm), in 93% yield. Gas liquid chromatography (6 ft silicone oil – SF 96 column at 218°) indicated a purity of 98 percent.

A small amount of the product was further purified by preparative gas-liquid chromatography.

Anal. Calcd. for $C_{17}H_{29}N$: C, 82.52; H, 11.81. Found: C, 82.37; H, 11.69.

This material revealed only a single peak on analytical gas-liquid chromatography through the silicone oil column at 218° or a 4 ft silicone rubber column at 227°; $n_D^{25}$ 1.4578; ir (neat) 2,260 cm$^{-1}$; nmr (20 percent in CCl$_4$) δ 0.88 (skew triplet, CH$_3$), 1.2 – 1.8 (multiplet), 2.0 – 2.4 (m, CH$_2$'s at 2, 7, and 10). The integration ratio of the 2.0 – 2.4 ppm signal to the others was 6:23, as required.

When essentially the same directions were followed with 85 ml of dimethyl sulfoxide, 3.8 g (0.080 mol) of sodium cyanide, and 18.0 g (0.052 mol) of 1-iodo-7-hexadecyne, the yield of distilled nitrile, b.p. 125–129° (0.1 – 0.03 mm) was 93 percent. Gas-liquid chromatography showed less than 1 percent impurity. Alcohol was also used successfully as the reaction solvent.

EXAMPLE 14

Methyl 8-Heptadecynoate (11). A mixture of 98 – 99 percent 1-cyano-7-hexadecyne (10; 11.1 g or 0.045 mol), sodium hydroxide (9.0 g or 0.23 mol) 95 percent ethanol (115 ml), and water (10 ml) was boiled for 17 hr. The cooled solution was diluted with 275 ml of water and then washed with ca. 100 ml of hexane. Acidification of the stirred and cooled solution by dropwise addition of 12N hydrochloric acid to pH 3 was followed by dilution with water to about 700 ml, and then extraction with ether. The extracts were washed several times with water, dried with sodium sulfate, and stripped of volatile solvents at room temperature. The faintly yellow residual solid was dissolved in 30 ml of dry ether and was treated with stirring and cooling with diazomethane (est. 3 g or 0.07 mol) by distilling diazomethane plus ether directly into the reaction flask. After a short time, excess reagent was swept out in a stream of nitrogen. Distillation of the remaining material through a Claisen head gave 11.8 g (94 percent) of water-white methyl 8-heptadecynoate (11), b.p. 125 – 128° (0.03 mm).

Anal. Calcd. for $C_{18}H_{32}O_2$: C, 77.09; H, 11.50. Found: C, 77.24; H, 11.50.

This product gave a single spot on thin-layer chromatography (silica gel, with 8:1 hexane-ether), and a single peak on gas-liquid chromatography (6 ft silicone oil SF-96 column at 220°). In a similar run, the same product, analyzed on a 6 ft neopentylglycol succinate (10 percent) column at 197° or on a 6 ft silicone rubber column (SE-30; 10 percent) at 218°, showed a purity of 99+ percent. Methyl 8-heptadecynoate (11) had the following properties: m.p. −11 to −13°; $n_D^{25}$ 1.4524; ir ($CCl_4$) 1,740 $cm^{-1}$; nmr ($CCl_4$) δ 0.88 (t, $CH_2CH_3$), 1.32 – 1.42 (complex), 2.08 (m, $CH_2$'s at 2, 7, and 10), 3.60 (s, $COOCH_3$). The integration ratio of the methyl ester signal to the others was 3:29. Raman absorption spectra were taken on a sample obtained by preparative gas-liquid chromatography through a 10 ft Carbowax 20-M column at 205°. The pure neat ester 11 in a laser-based Raman spectrophotometer showed absorption peaks at 2,237 and 2,295 $cm^{-1}$ with an intensity ratio of approximately 3:1. A pure sample of 4-octyne showed exactly the same kind of absorption, attributable to the disubstituted C ≡ C grouping.

EXAMPLE 15

8,9-Carboxymethano-8-heptadecenoic Acid (12). According to the general directions described above, ethyl diazoacetate (20.6 g; 0.18 mol) was added over a 6.5 hr period to 40.6 g (0.145 mol) of methyl 8-heptadecenoate (11) mixed with 0.1 g of powdered copper-bronze. The temperature was kept at 145 – 150°. When arrangements were made to measure the evolved nitrogen, it became clear that even at 140°, the diazoacetic ester decomposition occurred smoothly, rapidly, and quantitatively. Saponification of the red-brown reaction mixture was effected with potassium hydroxide (40.5 g; 0.72 mol) in boiling 95 percent alcohol (180 ml) and water (20 ml) for 4.5 hr. Isolation of acidic material afforded 50.2 g of a viscous orange oil, which was chromatographed on a column (3.7 × 80 cm) of silica gel (360 g) deactivated with about 15 percent of its weight of water. Untreated silica was not satisfactory, since the diacid moved much too slowly. The developing solvent at first was hexane alone and then hexane with gradually increasing amounts of ether until the hexane-ether ratio was 2:3. About 4.25 was used. Some 8-heptadecynoic acid (5.0 g or 13 percent), m.p. 29– 32°, was recovered in the earlier fractions. On a thin-layer chromatography plate (hexane-ether-acetic acid - 40:10:1), this acid showed a single spot with the same $R_F$ value as authentic 8-heptadecynoic acid. Later fractions, combined on the basis of thin-layer chromatography results, provided 34.3 g (73 percent) of single-spot 8,9-carboxymethano-8-heptadecenoic acid (12) as a faintly yellow oil, $n_D^{25}$ 1.714.

Anal. Calcd. for $C_{19}H_{32}O_4$: C, 70.33; H, 9.94; neut. eq., 162.2. Found: C, 70.55; H, 10.15; neut. eq., 165,161.

Although the above directions gave the best yield of diacid 12 (73 percent; 84 percent corrected for recovered starting acid), a more reproducible yield of 65 percent (69 percent corrected) was realized with a 2:1 instead of a 1.25:1 molar ratio of diazoacetic ester to acetylenic ester and with a 10-fold greater ratio of copper bronze to diazoacetic ester. In almost all of the additions, a slow moving component emerged after the desired diacid 12. This could have been the corresponding bicyclo [1,1,0]butane-triacid product, but the point was not pursued. Subsequent work showed that thin-layer chromatography using silica plates with 1:1 hexane-ether containing 5 – 10 percent (vol) of 1:1 acetone-acetic acid differentiated well between the acetylenic acid, the desired cyclopropene diacid 12, and the suspected triacid.

The homogeneous product 12, which crystallized (m.p. 42 – 45°) after some time in the refrigerator, gave ir absorption maxima at 1,700 (C=O) and 1,900 $cm^{-1}$ (cyclopropene);nmr ($CCl_4$), δ 0.88 (t, $CH_3$) 1.3 – 1.43 (m, $CH_2$'s at positions 3–7 and 11–16), 1.97 (s, cyclopropene H), 2.32 – 2.42 (m, $CH_2$'s at positions 2, 7, and 10), 12.18 (s, COOH).

EXAMPLE 16

Methyl Malvalate (8) from 8,9-Carboxymethano-8-heptadecenoic Acid (12). A solution of diacid 12 (3.9 g; 0.012 mol), oxalyl chloride (5.0 g; 0.040 mol), and 45 ml of dry ether was stirred at room temperature for 1.5 hr. After most of the volatile materials had been removed, the residual light-brown oily diacid chloride 13 was pumped at $10^{-3}$ mm to a constant weight of 4.3 g (99 percent); ir (neat) 1,785 (poorly resolved carbonyls) and 1,905, but nothing at 3,100 – 3,600 $cm^{-1}$.

The subsequent decarbonylation, esterification, and borohydride reduction in its essentials followed the procedure developed for the corresponding synthesis of methyl sterculate. After purification by column chromatography, the colorless product 8, homogeneous according to thin-layer chromatography, weighed 1.5 g (34 percent); other fractions (6 percent) which were largely methyl malvalate but with additional spots were also obtained. In other preparations, yields up to 43 percent were realized. All fractions from chromatography gave an immediate positive Halphen test. For the main fraction the following properties were noted: $n_D^{25}$ 1.4545, $n_D^{30}$ 1.4515; ir (neat) 1,745 (C=O), 1,875 (weak), and 1,005 (medium) $cm^{-1}$; nmr (20 percent in $CCl_4$) δ 0.75 (s, cyclopropene $CH_2$) 0.88 (distorted t, $CH_2CH_3$), 1.1 – 1.8 (complex), 2.20 (t, J = ca. 7 Hz, $CH_2$ at position 2), 2.35 (m, t, J = ca. 7 Hz, $CH_2$'s at 7 and 10), 3.55 (s, $OCH_3$). The integrations for the cyclopropene $CH_2$, ester $OCH_3$, and all the remaining protons were in the ratio: 2 (est.):3:29, as required for methyl malvalate (8).

Anal. Calcd. for $C_{19}H_{34}O_2$: C, 77.50; H, 11.64. Found: C, 77.57; H, 11.47.

Methyl malvalate (8), on attempted gas-liquid chromatography through a silicone fluid (SF-96) column at 222°, produced two peaks, with an 85:15 ratio of the faster to the slower moving component. No new thin-layer chromatography spots were developed when methyl malvalate was stored under nitrogen for 4 days at −17°. For longer storage periods, the solid material in sealed ampoules was held at −78°. Samples that had become yellow on standing could be purified by chromatography through silica gel or Florisil. Purification of the crude product could be accomplished satisfactorily though less conveniently by reverse phase chromatography. Attempted fractional crystallization in acetone at −70° gave little sign of separation. Urea adduction from methanol solvent at −5, −30, or −50° gave precipitates, but the material in the adduct and in the mother liquor differed but little in composition. Chromatography through a column of powdered urea with 50:1 hexane-methanol as eluting solvent gave no separation. Short-path distillation involving a 5 min exposure to 160° gave distillate showing distinct olefinic proton signals in the nmr curve at δ 4.8 and 5.33 – 6.3. Although evaporative distillation in a wide bore bulb-to-bulb apparatus at 110° (5 × $10^{-4}$mm) did not introduce olefinic impurities and appeared promixing, the method was not developed. Exposure to temperatures greater than 120° is to be avoided.

When anhydrous ferric chloride or aluminum chloride was substituted for zinc chloride in the decarbonylation, evolution of carbon monoxide was more rapid. When ferric chloride was used, mixing with borohydride in the reduction step produced a black precipitate (iron boride?) possibly effective in the catalytic decomposition of the borohydride; the yield of methyl malvalate here was 10 – 30 percent. In general, aluminum chloride gave yields in the order of 20 – 30 percent, although in one exceptional case in the analogous synthesis of methyl steruclate, the yield was 45 percent from the corresponding diacid.

EXAMPLE 17

The Methanethiol Adduct from Methyl Malvalate (8). A sample of homogeneous methyl malvalate (0.333 g or 1.13 mmol) was allowed to stand away from air for 8 days at room temperature with 15 ml of a 10 percent benzene solution of methyl mercaptan. After volatiles were blown off in a stream of pure nitrogen, the residue was pumped in a high vacuum to a constant weight of 0.389 g (100.5 percent). This methyl mercaptan adduct was colorless though faintly milky. It showed the same single spot on thin-layer chromatography and the same single peak on gas-liquid chromatography as the sample obtained after further purification. Preparative gas-liquid chromatography, using an 8 ft 10 percent silicone oil (SE-30) column at 230° with helium as the carrier, provided approximately 0.3 ml of water white product.

Anal. Calcd. for $C_{20}H_{38}O_2S$: C, 70.12; H, 11.18. Found: C, 70.12; H, 11.32.

The adduct gave one spot on thin-layer chromatography on a silica plate with 8:1 hexane-ether as developing solvent. Gas-liquid chromatography through a 6-ft silicone oil (SF-96) column at 230° produced a single symmetrical peak. The adduct showed $n_D^{25}$ 1.4702; ir (neat) 3,060 (cyclopropane), but no peaks at 1,875 or 1,005 $cm^{-1}$; nmr (20 percent in $CCl_4$) δ 0.3–0.85 (complex, cyclopropane H's), 00.90 (distorted t, $CH_3$ at position 17), 1.1 – 1.8 (complex), 2.0 (s, $SCH_3$), 2.2 (distorted t, $CH_2COOCH_3$), 3.60 (s, $OCH_3$). The ratio of the area under the 3.60 ppm signal to all others was very close to the expected 3:35.

I claim:

1. A compound represented by the formula

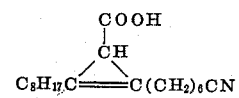

* * * * *